J. B. SMALL, E. G. MATTHEWS & F. F. HOLBROOK.
Improvement in Swivel-Clevises for Plows.

No. 114,212.  Patented April 25, 1871.

Witnesses
Thos. H. Dodge
A. C. Peirce

Inventors
Josiah B. Small
E. G. Matthews
Franklin F. Holbrook

UNITED STATES PATENT OFFICE.

JOSIAH B. SMALL, OF BOSTON, ELBRIDGE G. MATTHEWS, OF OAKHAM, AND FRANKLIN F. HOLBROOK, OF BOSTON, MASSACHUSETTS.

IMPROVEMENT IN SWIVEL-CLEVISES FOR PLOWS.

Specification forming part of Letters Patent No. 114,212, dated April 25, 1871.

*To all whom it may concern:*

Be it known that we, JOSIAH B. SMALL, of Boston, in the county of Suffolk, ELBRIDGE G. MATTHEWS, of Oakham, in the county of Worcester, and FRANKLIN F. HOLBROOK, of Boston, in the county of Suffolk and State of Massachusetts, have invented certain new and useful Improvements in Swivel-Clevises for Plows; and we do hereby declare the following to be a full, clear, and exact description of the same, reference being had to the accompanying drawings, which form a part of this specification, in which—

Figure 1:
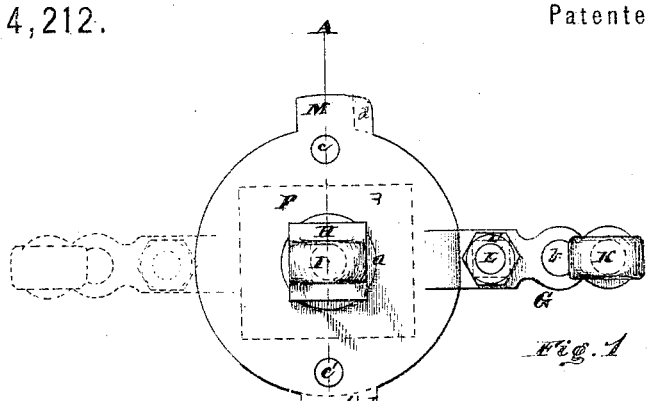
Figure 2:
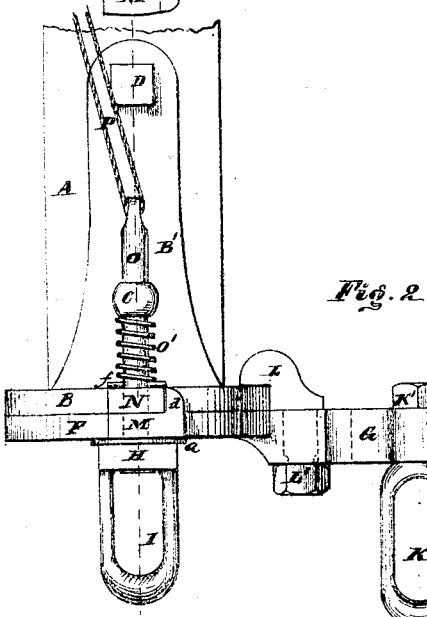
Figure 3:
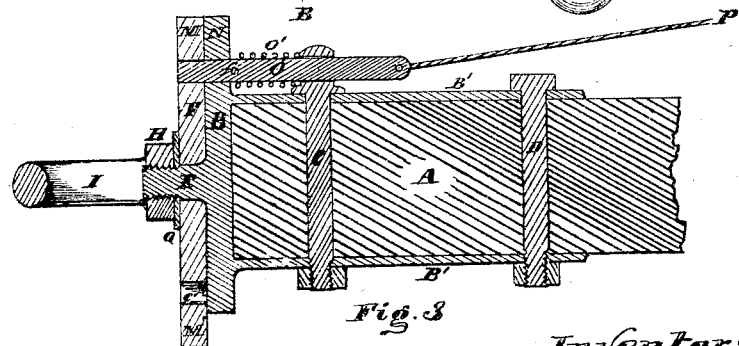

Figure 1 represents a front view of our improved swivel-clevis. Fig. 2 represents a plan view of the same, and Fig. 3 represents a central vertical section at line A B.

To enable those skilled in the art to which our invention belongs to make and use the same, we will proceed to describe it more in detail.

The object of our invention is to produce a clevis which can be used upon a one-horse swivel-plow—one which will throw the plow sufficiently to land to allow the horse to walk in the last furrow, while it can readily be reversed at the end of the furrow, or when the plow is reversed, as hereinafter described.

In the drawings, the part marked A indicates the end of the plow-beam, to which is secured a circular face-plate, B, by means of ear-pieces B', which fit onto the top and bottom sides of the beam A, where they are secured by bolts C and D, which pass through the beam, as indicated. A pintle-bolt, E, projects from the center of the face-plate B, upon which is hung a reversible disk, F, having at one side the arm G of the clevis. The disk F is held against the face-plate B by means of a nut, H, screwed onto the end of the pintle-bolt E, a washer, a, being inserted between the nut and disk, as shown. A loop, I, is formed on or with the nut H, to which the team can be hitched, when desired. A swivel-loop, K, is arranged at the outer end of the clevis-arm G. The shank of said loop K passes through the arm G, where it is secured by a nut, K', screwed onto the end of the shank. Several holes, b, may be formed through the arm, in either of which the swivel-loop K may be set to adjust the draft to the proper alignment.

A hook, L, is arranged in arm G, which locks upon the rear side of the face-plate B and takes the strain off from the pintle-bolt. The shank of the hook L is formed square, and it is fitted into a similar-shaped opening in the arm, so that it cannot become twisted out of place. It is secured by the nut L', which screws onto the end of its shank. Lugs M M' are formed at the upper and lower edges of the disk F, which have backward-projecting flanges d, that strike against the stop-lug N at the upper edge of the face-plate B, and stop the disk when the arm G is in working position. A spring catch or bolt, O, is arranged in the top of bolt C, the front end of which enters one of the openings c c' formed in the disk F, and thereby locks the disk when the arm G is in working position. The bolt or catch O is pressed forward by a coiled-wire spring, O', arranged around its central part, with one end pressing against the head of bolt C and the other end against a pin, f, set in the bolt O, as shown in the drawings. The bolt O can be drawn back to release the disk F by means of a cord, chain, or rod, P, which extends from the rear end of the bolt to the hand of the operator.

If preferred, a different device may be employed for locking the disk in position in lieu of the bolt O.

To reverse the clevis, the operator draws back the catch-bolt by means of the cord P, and the arm G drops down with the weight of the chain and whiffletree. The operator then drops the front end of the beam to the ground, and by a slight turn of the plow carries the arm G up the other side until the flange of the lug M' strikes the lug N, when the catch-bolt O springs into the opening c' and retains the arm G and disk F in the position indicated by dotted lines in Fig. 1 of the drawings.

From the foregoing description those skilled in the art to which our invention belongs will perceive that our improved reversible or swivel clevis is of great practical value, not only for swivel-plows, but for use upon ordinary right and left hand plows. It is especially valuable for use upon a two-horse swivel-plow in plowing soft meadow land, as by its use the plow can be swung off sufficiently to enable both horses to travel upon the unturned sod. It will also be found convenient upon a singlehorse plow in plowing gardens and orchards, where it is desirable to run the plow near to fences or trees, since by swinging the plow to one side the horse is allowed sufficient space to travel with ease.

Instead of making the hook L separate from the reversible disk F, it may be cast with the disk, in which case we prefer forming the circular face-plate B with a slot through it of sufficient size to admit of the hook being passed through it when the disk is being placed in position upon the pintle-bolt E, said slot being made at a point out of the line of draft of said hook, and with its edges beveled off a little to prevent the hook catching when the clevis is being reversed.

The disk F may be fastened, if preferred, to the face-plate B by any suitable catch device in lieu of the spring-catch bolt O, and hooks may be used in lieu of loops I and K.

Having described our improved swivel-clevis for plows, what we claim therein as new and of our invention, and desire to secure by Letters Patent, is—

1. The combination, with the arm G and face-plate B, of the hook L, substantially as and for the purposes set forth.

2. The combination, with the beam A, face-plate B, and disk F, of a spring-catch device, for the purposes stated.

3. The combination, with the face-plate B, disk F, and arm G, of the swivel-loop K and catch-bolt O, substantially as and for the purposes set forth.

JOSIAH B. SMALL.
E. G. MATTHEWS.
FRANKLIN F. HOLBROOK.

Witnesses:
THOS. H. DODGE,
A. E. PEIRCE.